US012586381B2

(12) United States Patent
Chaurasia et al.

(10) Patent No.: US 12,586,381 B2
(45) Date of Patent: Mar. 24, 2026

(54) METHOD AND SYSTEM FOR OPERATING A VIDEO SURVEILLANCE SYSTEM INCLUDING PREDICTING AND DISPLAYING POSSIBLE FUTURE ACTIVITY OF A PERSON OF INTEREST

(71) Applicant: Honeywell International Inc., Charlotte, NC (US)

(72) Inventors: Jitendra S. Chaurasia, Bengaluru (IN); Anchal Gupta, Punjab (IN); Mourian Balasubramanian, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/800,856

(22) Filed: Aug. 12, 2024

(65) Prior Publication Data

US 2026/0045089 A1 Feb. 12, 2026

(51) Int. Cl.
| | |
|---|---|
| *G06V 20/52* | (2022.01) |
| *G06T 7/20* | (2017.01) |
| *G06V 10/764* | (2022.01) |
| *G06V 40/20* | (2022.01) |

(52) U.S. Cl.
CPC .............. *G06V 20/52* (2022.01); *G06T 7/20* (2013.01); *G06V 10/764* (2022.01); *G06V 40/20* (2022.01); *G06V 2201/07* (2022.01)

(58) Field of Classification Search
None
See application file for complete search history.

(56) References Cited

U.S. PATENT DOCUMENTS

| | | |
|---|---|---|
| 11,430,171 B2 | 8/2022 | Amer et al. |
| 11,735,017 B2 | 8/2023 | Albero et al. |
| 2017/0249515 A1* | 8/2017 | Bai .................. G06V 30/19173 |

(Continued)

FOREIGN PATENT DOCUMENTS

| | | |
|---|---|---|
| CN | 110427824 A | 11/2019 |
| EP | 4053821 A1 | 9/2022 |

OTHER PUBLICATIONS

"Live Security Guards Behind Every Security Camera, Preventing Crime with Live Security Camera Monitoring," available online at https://www.deepsentinel.com/, retrieved on Oct. 9, 2024, 24 pages.

(Continued)

*Primary Examiner* — Hung Q Dang
(74) *Attorney, Agent, or Firm* — Seager, Tufte & Wickhem, LLP

(57) ABSTRACT

Video analytics are used to identify people in a plurality of video streams. Trained Artificial Intelligence (AI) models are used to identify an intent of each of the identified people based on the plurality of video streams. A person of interest is identified as a person having an intent of concern. For the person of interest, recorded video streams are processed to identify past activities of the person of interest and trained AI models are used to predict a future activity of the person of interest. A description of the predicted future activity of the person of interest is provided to a Generative AI model that generates a simulated video stream of the person of interest performing the predicted future activity. The simulated video stream is displayed on an operator console.

20 Claims, 11 Drawing Sheets

(56)  References Cited

U.S. PATENT DOCUMENTS

| | | | |
|---|---|---|---|
| 2018/0027383 A1 | 1/2018 | Seidman et al. | |
| 2019/0294885 A1 | 9/2019 | Janakiraman et al. | |
| 2021/0279511 A1* | 9/2021 | Gordon | G06V 10/774 |
| 2022/0138347 A1* | 5/2022 | Mcdonagh | A61B 5/7275 |
| | | | 705/2 |
| 2023/0186625 A1* | 6/2023 | Osindero | G06V 10/82 |
| | | | 348/415.1 |
| 2023/0300387 A1* | 9/2023 | Kalish | H04N 21/47217 |
| | | | 725/116 |
| 2023/0362460 A1* | 11/2023 | Jayachandran | G11B 27/036 |
| 2024/0070951 A1* | 2/2024 | Tiwari | G06N 20/00 |
| 2024/0176933 A1* | 5/2024 | Xiao | G06T 17/00 |
| 2024/0257429 A1* | 8/2024 | Starke | G06T 15/503 |
| 2024/0330759 A1* | 10/2024 | Jordan | G06F 40/30 |
| 2024/0371166 A1* | 11/2024 | Ghoddoosian | G06V 10/82 |
| 2024/0428491 A1* | 12/2024 | Yoon | G06T 13/40 |
| 2025/0014338 A1* | 1/2025 | Zhang | G06V 40/20 |
| 2025/0037469 A1* | 1/2025 | Oh | G06V 10/7715 |

OTHER PUBLICATIONS

"Real-world Anomaly Detection in Surveillance Videos," UFC, Center For Reseach in Computer Vision, available online at https://www.crcv.ucf.edu/projects/real-world/, retrieved on Oct. 9, 2024, 6 pages.

Dr. Pei-Fen Kuo, "Defining Prediction Varia-bles for Theft Crimes by App-lying Data MiningTechniques", Aug. 12, 2024, 2 pages.

Fernando, T., et al., "Tracking by Prediction: A Deep Generative Model for Mutli-Person localisation and Tracking", arXiv:1803.03347v1 [cs.CV], Mar. 9, 2018, 11 pages.

InsightSoftware, "Top 5 Predictive Analytics Models and Algorithms", available online at: <https://insightsoftware.com/blog/top-5-predictive-analytics-models-and-algorithms/>, Jan. 1, 2023, 13 pages.

Khatun, M. R., et al., "Data mining technique to analyse and predict crime using crime categories and arrest records", Indonesian Journal of Electrical Engineering and Computer Science, vol. 22, No. 2, May 2021, pp. 1052-1060.

Matellio, "How to Develop an AI-Based Video Analytics Software?", Data Analytics, Software Development, Jun. 15, 2023, 1 page.

Sergiu Oprea et al: "A Review on Deep 1-15 Learning Techniques for Video Prediction", Arxiv.Org, Cornell University Library, 201 Olin Library Cornell University Ithaca, NY 14853, Apr. 10, 2020 (Apr. 10, 2020), XP081642562, * sections 2. Video Prediction and 3, Backbone Deep Learning Architectures (27 PGS).

Kong Yu et al: "Human Action Recognition 1-15 and Prediction: A Survey", International Journal of Computer Vision, Springer US, New York, vol. 130, No. 5, Mar. 28, 2022 (Mar. 28, 2022), pp. 1366-1401, XP037805269 [retrieved on Mar. 28, 2022] (36 PGS).

* cited by examiner

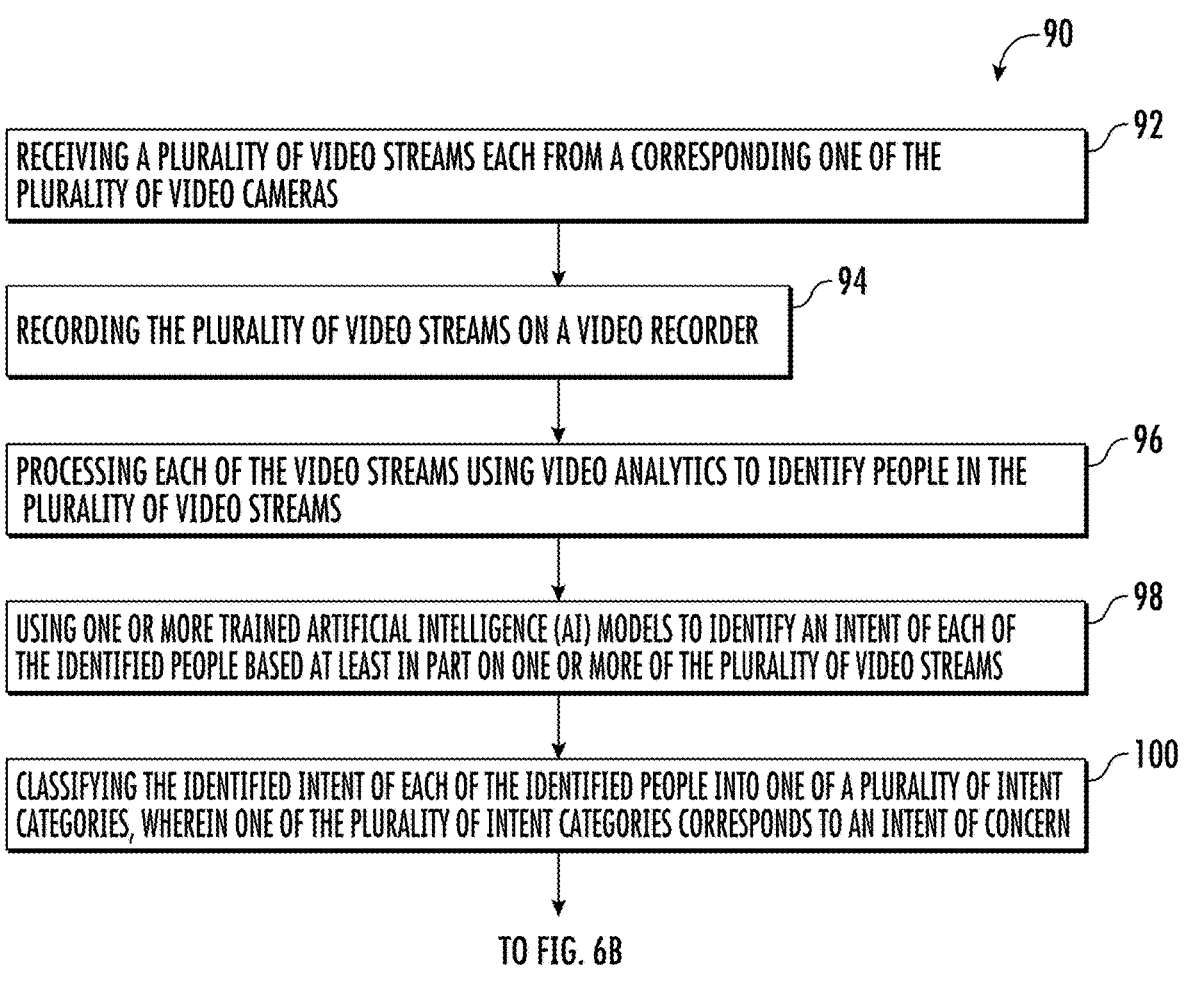

90

92 RECEIVING A PLURALITY OF VIDEO STREAMS EACH FROM A CORRESPONDING ONE OF THE PLURALITY OF VIDEO CAMERAS

94 RECORDING THE PLURALITY OF VIDEO STREAMS ON A VIDEO RECORDER

96 PROCESSING EACH OF THE VIDEO STREAMS USING VIDEO ANALYTICS TO IDENTIFY PEOPLE IN THE PLURALITY OF VIDEO STREAMS

98 USING ONE OR MORE TRAINED ARTIFICIAL INTELLIGENCE (AI) MODELS TO IDENTIFY AN INTENT OF EACH OF THE IDENTIFIED PEOPLE BASED AT LEAST IN PART ON ONE OR MORE OF THE PLURALITY OF VIDEO STREAMS

100 CLASSIFYING THE IDENTIFIED INTENT OF EACH OF THE IDENTIFIED PEOPLE INTO ONE OF A PLURALITY OF INTENT CATEGORIES, WHEREIN ONE OF THE PLURALITY OF INTENT CATEGORIES CORRESPONDS TO AN INTENT OF CONCERN

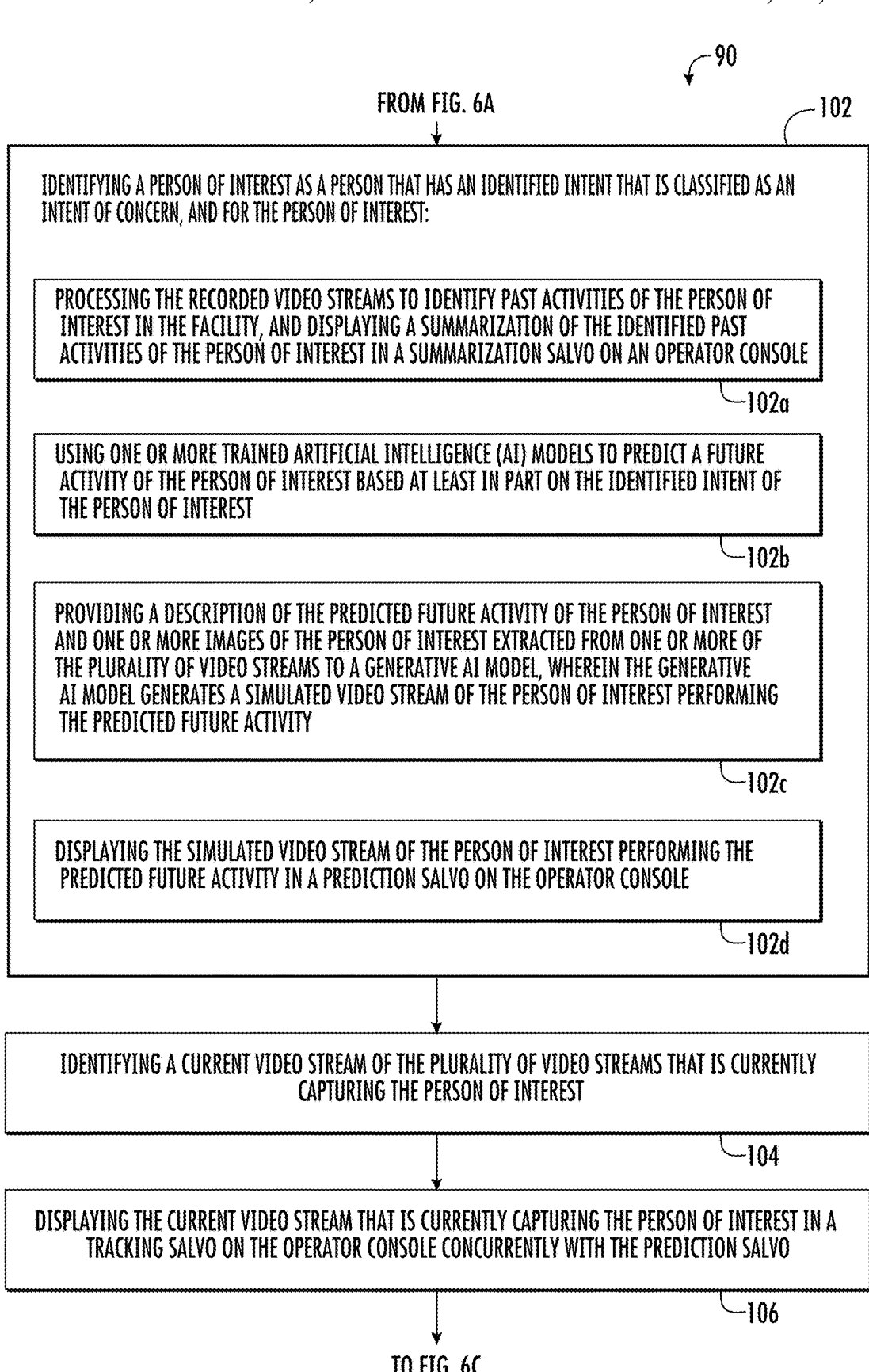

FROM FIG. 6A

IDENTIFYING A PERSON OF INTEREST AS A PERSON THAT HAS AN IDENTIFIED INTENT THAT IS CLASSIFIED AS AN INTENT OF CONCERN, AND FOR THE PERSON OF INTEREST:

PROCESSING THE RECORDED VIDEO STREAMS TO IDENTIFY PAST ACTIVITIES OF THE PERSON OF INTEREST IN THE FACILITY, AND DISPLAYING A SUMMARIZATION OF THE IDENTIFIED PAST ACTIVITIES OF THE PERSON OF INTEREST IN A SUMMARIZATION SALVO ON AN OPERATOR CONSOLE

102a

USING ONE OR MORE TRAINED ARTIFICIAL INTELLIGENCE (AI) MODELS TO PREDICT A FUTURE ACTIVITY OF THE PERSON OF INTEREST BASED AT LEAST IN PART ON THE IDENTIFIED INTENT OF THE PERSON OF INTEREST

102b

PROVIDING A DESCRIPTION OF THE PREDICTED FUTURE ACTIVITY OF THE PERSON OF INTEREST AND ONE OR MORE IMAGES OF THE PERSON OF INTEREST EXTRACTED FROM ONE OR MORE OF THE PLURALITY OF VIDEO STREAMS TO A GENERATIVE AI MODEL, WHEREIN THE GENERATIVE AI MODEL GENERATES A SIMULATED VIDEO STREAM OF THE PERSON OF INTEREST PERFORMING THE PREDICTED FUTURE ACTIVITY

102c

DISPLAYING THE SIMULATED VIDEO STREAM OF THE PERSON OF INTEREST PERFORMING THE PREDICTED FUTURE ACTIVITY IN A PREDICTION SALVO ON THE OPERATOR CONSOLE

102d

102

IDENTIFYING A CURRENT VIDEO STREAM OF THE PLURALITY OF VIDEO STREAMS THAT IS CURRENTLY CAPTURING THE PERSON OF INTEREST

104

DISPLAYING THE CURRENT VIDEO STREAM THAT IS CURRENTLY CAPTURING THE PERSON OF INTEREST IN A TRACKING SALVO ON THE OPERATOR CONSOLE CONCURRENTLY WITH THE PREDICTION SALVO

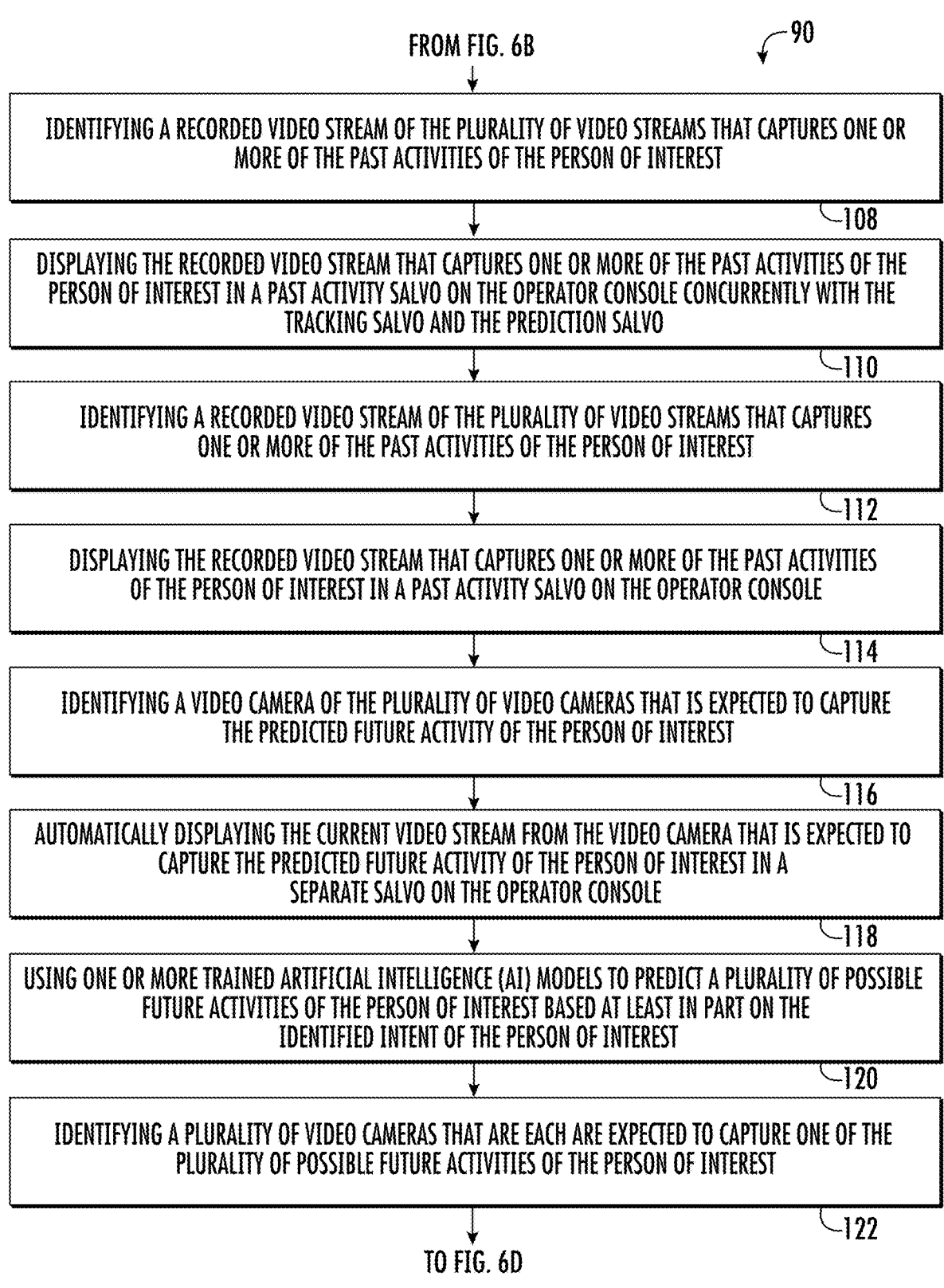

FROM FIG. 6B

90

IDENTIFYING A RECORDED VIDEO STREAM OF THE PLURALITY OF VIDEO STREAMS THAT CAPTURES ONE OR MORE OF THE PAST ACTIVITIES OF THE PERSON OF INTEREST

108

DISPLAYING THE RECORDED VIDEO STREAM THAT CAPTURES ONE OR MORE OF THE PAST ACTIVITIES OF THE PERSON OF INTEREST IN A PAST ACTIVITY SALVO ON THE OPERATOR CONSOLE CONCURRENTLY WITH THE TRACKING SALVO AND THE PREDICTION SALVO

110

IDENTIFYING A RECORDED VIDEO STREAM OF THE PLURALITY OF VIDEO STREAMS THAT CAPTURES ONE OR MORE OF THE PAST ACTIVITIES OF THE PERSON OF INTEREST

112

DISPLAYING THE RECORDED VIDEO STREAM THAT CAPTURES ONE OR MORE OF THE PAST ACTIVITIES OF THE PERSON OF INTEREST IN A PAST ACTIVITY SALVO ON THE OPERATOR CONSOLE

114

IDENTIFYING A VIDEO CAMERA OF THE PLURALITY OF VIDEO CAMERAS THAT IS EXPECTED TO CAPTURE THE PREDICTED FUTURE ACTIVITY OF THE PERSON OF INTEREST

116

AUTOMATICALLY DISPLAYING THE CURRENT VIDEO STREAM FROM THE VIDEO CAMERA THAT IS EXPECTED TO CAPTURE THE PREDICTED FUTURE ACTIVITY OF THE PERSON OF INTEREST IN A SEPARATE SALVO ON THE OPERATOR CONSOLE

118

USING ONE OR MORE TRAINED ARTIFICIAL INTELLIGENCE (AI) MODELS TO PREDICT A PLURALITY OF POSSIBLE FUTURE ACTIVITIES OF THE PERSON OF INTEREST BASED AT LEAST IN PART ON THE IDENTIFIED INTENT OF THE PERSON OF INTEREST

120

IDENTIFYING A PLURALITY OF VIDEO CAMERAS THAT ARE EACH ARE EXPECTED TO CAPTURE ONE OF THE PLURALITY OF POSSIBLE FUTURE ACTIVITIES OF THE PERSON OF INTEREST

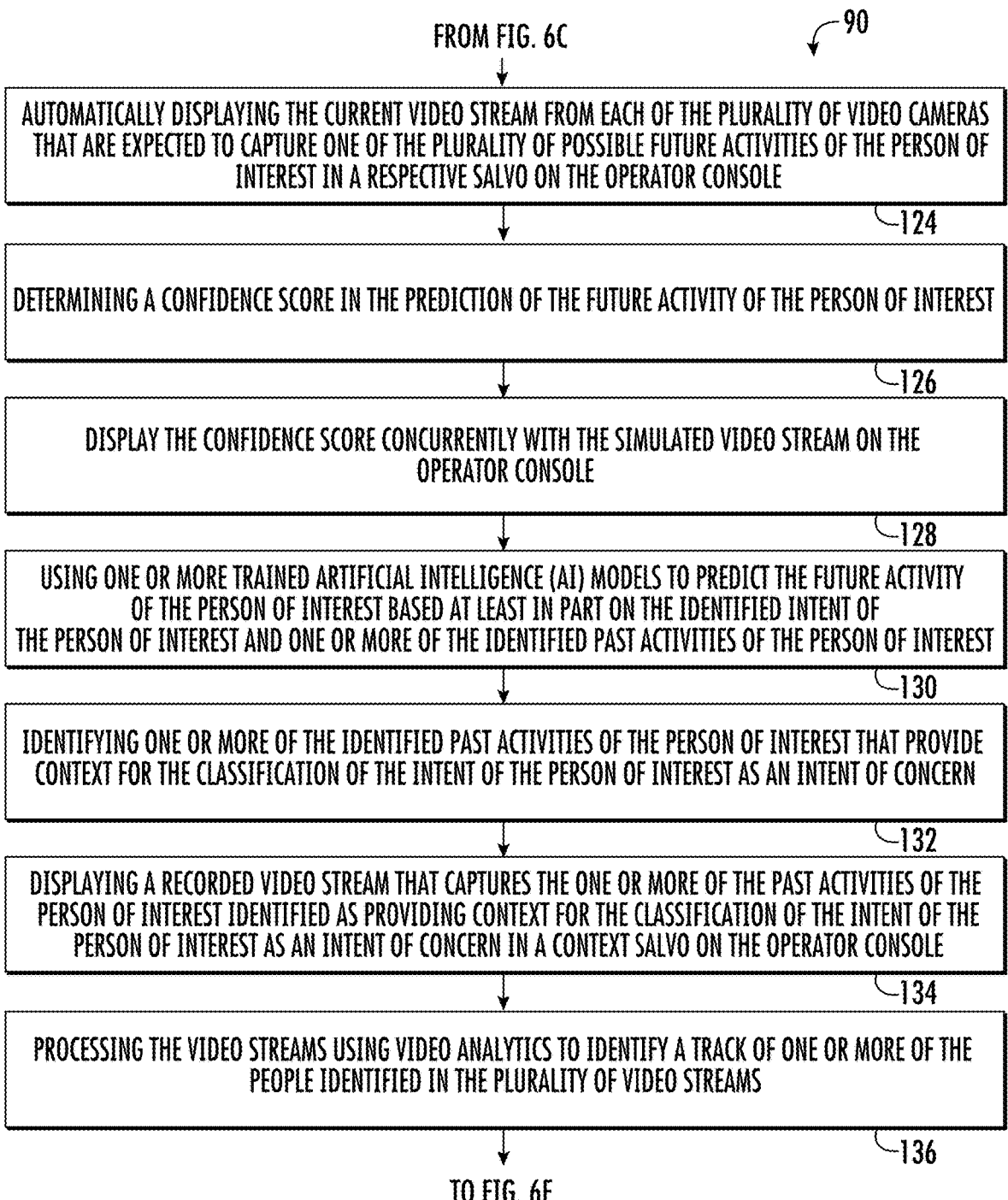

FROM FIG. 6C                                                    90

AUTOMATICALLY DISPLAYING THE CURRENT VIDEO STREAM FROM EACH OF THE PLURALITY OF VIDEO CAMERAS THAT ARE EXPECTED TO CAPTURE ONE OF THE PLURALITY OF POSSIBLE FUTURE ACTIVITIES OF THE PERSON OF INTEREST IN A RESPECTIVE SALVO ON THE OPERATOR CONSOLE
124

DETERMINING A CONFIDENCE SCORE IN THE PREDICTION OF THE FUTURE ACTIVITY OF THE PERSON OF INTEREST
126

DISPLAY THE CONFIDENCE SCORE CONCURRENTLY WITH THE SIMULATED VIDEO STREAM ON THE OPERATOR CONSOLE
128

USING ONE OR MORE TRAINED ARTIFICIAL INTELLIGENCE (AI) MODELS TO PREDICT THE FUTURE ACTIVITY OF THE PERSON OF INTEREST BASED AT LEAST IN PART ON THE IDENTIFIED INTENT OF THE PERSON OF INTEREST AND ONE OR MORE OF THE IDENTIFIED PAST ACTIVITIES OF THE PERSON OF INTEREST
130

IDENTIFYING ONE OR MORE OF THE IDENTIFIED PAST ACTIVITIES OF THE PERSON OF INTEREST THAT PROVIDE CONTEXT FOR THE CLASSIFICATION OF THE INTENT OF THE PERSON OF INTEREST AS AN INTENT OF CONCERN
132

DISPLAYING A RECORDED VIDEO STREAM THAT CAPTURES THE ONE OR MORE OF THE PAST ACTIVITIES OF THE PERSON OF INTEREST IDENTIFIED AS PROVIDING CONTEXT FOR THE CLASSIFICATION OF THE INTENT OF THE PERSON OF INTEREST AS AN INTENT OF CONCERN IN A CONTEXT SALVO ON THE OPERATOR CONSOLE
134

PROCESSING THE VIDEO STREAMS USING VIDEO ANALYTICS TO IDENTIFY A TRACK OF ONE OR MORE OF THE PEOPLE IDENTIFIED IN THE PLURALITY OF VIDEO STREAMS
136

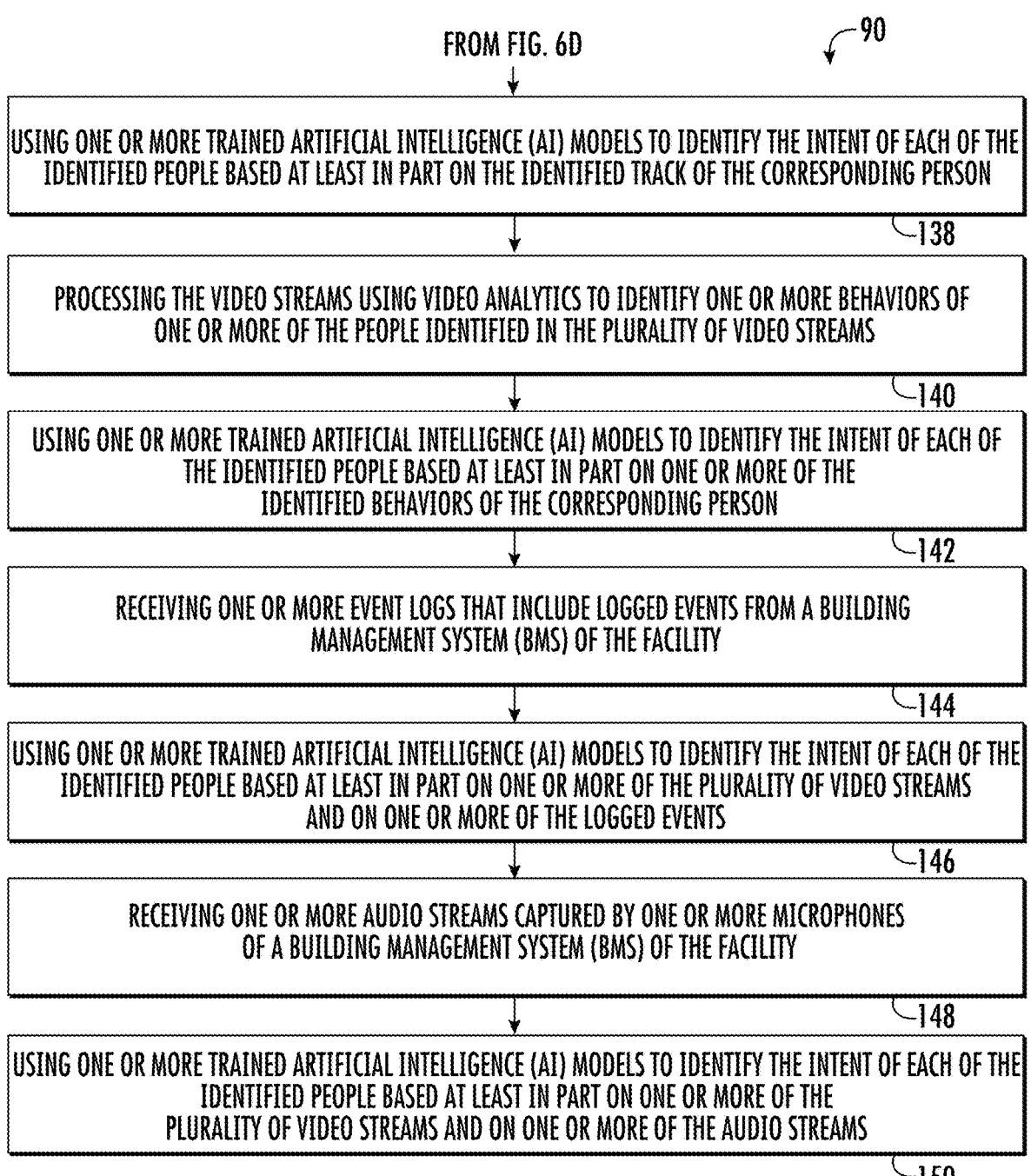

FROM FIG. 6D                                    90

USING ONE OR MORE TRAINED ARTIFICIAL INTELLIGENCE (AI) MODELS TO IDENTIFY THE INTENT OF EACH OF THE IDENTIFIED PEOPLE BASED AT LEAST IN PART ON THE IDENTIFIED TRACK OF THE CORRESPONDING PERSON

138

PROCESSING THE VIDEO STREAMS USING VIDEO ANALYTICS TO IDENTIFY ONE OR MORE BEHAVIORS OF ONE OR MORE OF THE PEOPLE IDENTIFIED IN THE PLURALITY OF VIDEO STREAMS

140

USING ONE OR MORE TRAINED ARTIFICIAL INTELLIGENCE (AI) MODELS TO IDENTIFY THE INTENT OF EACH OF THE IDENTIFIED PEOPLE BASED AT LEAST IN PART ON ONE OR MORE OF THE IDENTIFIED BEHAVIORS OF THE CORRESPONDING PERSON

142

RECEIVING ONE OR MORE EVENT LOGS THAT INCLUDE LOGGED EVENTS FROM A BUILDING MANAGEMENT SYSTEM (BMS) OF THE FACILITY

144

USING ONE OR MORE TRAINED ARTIFICIAL INTELLIGENCE (AI) MODELS TO IDENTIFY THE INTENT OF EACH OF THE IDENTIFIED PEOPLE BASED AT LEAST IN PART ON ONE OR MORE OF THE PLURALITY OF VIDEO STREAMS AND ON ONE OR MORE OF THE LOGGED EVENTS

146

RECEIVING ONE OR MORE AUDIO STREAMS CAPTURED BY ONE OR MORE MICROPHONES OF A BUILDING MANAGEMENT SYSTEM (BMS) OF THE FACILITY

148

USING ONE OR MORE TRAINED ARTIFICIAL INTELLIGENCE (AI) MODELS TO IDENTIFY THE INTENT OF EACH OF THE IDENTIFIED PEOPLE BASED AT LEAST IN PART ON ONE OR MORE OF THE PLURALITY OF VIDEO STREAMS AND ON ONE OR MORE OF THE AUDIO STREAMS

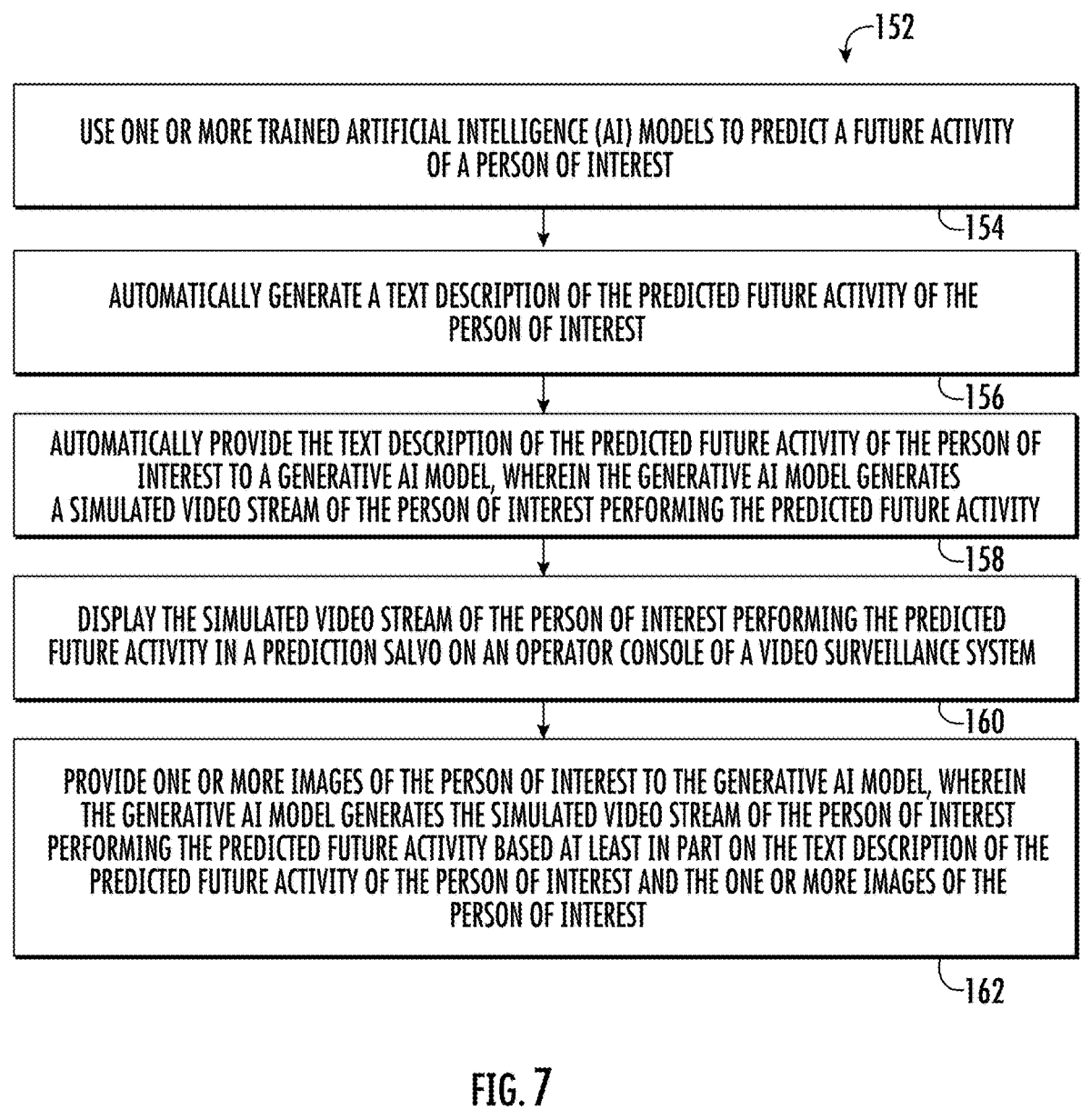

┌─────────────────────────────────────────────────────────────────────────┐
│ USE ONE OR MORE TRAINED ARTIFICIAL INTELLIGENCE (AI) MODELS TO PREDICT A FUTURE ACTIVITY │
│ OF A PERSON OF INTEREST                                                    │
└─────────────────────────────────────────────────────────────────────────┘
　　　　　　　　　　　　　　　　　　　　　　　　　　　　　　　　　　└─154

┌─────────────────────────────────────────────────────────────────────────┐
│ AUTOMATICALLY GENERATE A TEXT DESCRIPTION OF THE PREDICTED FUTURE ACTIVITY OF THE │
│ PERSON OF INTEREST                                                         │
└─────────────────────────────────────────────────────────────────────────┘
　　　　　　　　　　　　　　　　　　　　　　　　　　　　　　　　　　└─156

┌─────────────────────────────────────────────────────────────────────────┐
│ AUTOMATICALLY PROVIDE THE TEXT DESCRIPTION OF THE PREDICTED FUTURE ACTIVITY OF THE PERSON OF │
│ INTEREST TO A GENERATIVE AI MODEL, WHEREIN THE GENERATIVE AI MODEL GENERATES │
│ A SIMULATED VIDEO STREAM OF THE PERSON OF INTEREST PERFORMING THE PREDICTED FUTURE ACTIVITY │
└─────────────────────────────────────────────────────────────────────────┘
　　　　　　　　　　　　　　　　　　　　　　　　　　　　　　　　　　└─158

┌─────────────────────────────────────────────────────────────────────────┐
│ DISPLAY THE SIMULATED VIDEO STREAM OF THE PERSON OF INTEREST PERFORMING THE PREDICTED │
│ FUTURE ACTIVITY IN A PREDICTION SALVO ON AN OPERATOR CONSOLE OF A VIDEO SURVEILLANCE SYSTEM │
└─────────────────────────────────────────────────────────────────────────┘
　　　　　　　　　　　　　　　　　　　　　　　　　　　　　　　　　　└─160

┌─────────────────────────────────────────────────────────────────────────┐
│ PROVIDE ONE OR MORE IMAGES OF THE PERSON OF INTEREST TO THE GENERATIVE AI MODEL, WHEREIN │
│ THE GENERATIVE AI MODEL GENERATES THE SIMULATED VIDEO STREAM OF THE PERSON OF INTEREST │
│ PERFORMING THE PREDICTED FUTURE ACTIVITY BASED AT LEAST IN PART ON THE TEXT DESCRIPTION OF THE │
│ PREDICTED FUTURE ACTIVITY OF THE PERSON OF INTEREST AND THE ONE OR MORE IMAGES OF THE │
│ PERSON OF INTEREST                                                         │
└─────────────────────────────────────────────────────────────────────────┘
　　　　　　　　　　　　　　　　　　　　　　　　　　　　　　　　　　└─162

FIG. 7

METHOD AND SYSTEM FOR OPERATING A VIDEO SURVEILLANCE SYSTEM INCLUDING PREDICTING AND DISPLAYING POSSIBLE FUTURE ACTIVITY OF A PERSON OF INTEREST

TECHNICAL FIELD

The present disclosure relates generally to video surveillance systems, and more particularly to video surveillance systems configured to provide predictions of future activity.

BACKGROUND

Video surveillance systems can include a large number of video cameras, with each of the video cameras producing a video stream. It can be difficult for system operators to manually review each of these videos streams to look for possible events or incidents of interest. What would be desirable are systems and methods for increasing the capability of video surveillance systems to analyze video streams and automatically predict possible future activity of a person of interest such that the system operators can anticipate and possibly take action before the predicted possible future activity of the person of interest occurs.

SUMMARY

The present disclosure relates generally to video surveillance systems, and more particularly to video surveillance systems configured to provide predictions of future activity. An example may be found in a method for operating a video surveillance system of a facility that includes a plurality of video cameras distributed about the facility. The illustrative method includes receiving a plurality of video streams each from a corresponding one of the plurality of video cameras and recording the plurality of video streams on a video recorder. Each of the video streams are processed using video analytics to identify people in the plurality of video streams. One or more trained Artificial Intelligence (AI) models are used to identify an intent of each of the identified people based at least in part on the activity of each of the identified people captured in one or more of the plurality of video streams. The identified intent of each of the identified people is classified into one of a plurality of intent categories, wherein one of the plurality of intent categories corresponds to an intent of concern. The illustrative method includes identifying a person of interest as a person that has an identified intent that is classified as an intent of concern. For the person of interest, the recorded video streams are processed to identify past activities of the person of interest in the facility, and a summarization of the identified past activities of the person of interest is displayed in a summarization salvo on an operator console. For the person of interest, one or more trained Artificial Intelligence (AI) models are used to predict a future activity of the person of interest based at least in part on the identified intent of the person of interest. For the person of interest, a description of the predicted future activity of the person of interest is provided sometimes along with one or more images of the person of interest extracted from one or more of the plurality of video streams to a Generative AI model, wherein the Generative AI model generates a simulated video stream of the person of interest performing the predicted future activity. For the person of interest, the simulated video stream of the person of interest performing the predicted future activity is displayed in a prediction salvo on the operator console.

Another example may be found in a video surveillance system of a facility. The video surveillance system includes a plurality of video cameras distributed about the facility providing a plurality of video streams, a video recorder recording the plurality of video streams, an operator console, and a controller operatively coupled to the plurality of video cameras, the video recorder and the operator console. The controller is configured to process each of the video streams using video analytics to identify people in the plurality of video streams and to identify an intent of each of the identified people based at least in part on activities of each of the identified people captured in one or more of the plurality of video streams. The controller is configured to classify the identified intent of each of the identified people into one of a plurality of intent categories, wherein one of the plurality of intent categories corresponds to an intent of concern. The controller is configured to identify a person of interest as a person that has an identified intent that is classified as an intent of concern, and for the person of interest, the controller is configured to use one or more trained Artificial Intelligence (AI) models to predict a future activity of the person of interest based at least in part on the identified intent of the person of interest. For the person of interest, the controller is configured to provide a description of the predicted future activity of the person of interest to a Generative AI model, wherein the Generative AI model generates a simulated video stream of the person of interest (or a generic person) performing the predicted future activity. The controller is configured to display the simulated video stream of the person of interest performing the predicted future activity in a prediction salvo on the operator console.

Another example may be found in a non-transitory computer readable medium storing instructions thereon. When the instructions are executed by one or more processors, the one or more processors are caused to use one or more trained Artificial Intelligence (AI) models to predict a future activity of a person of interest. When the instructions are executed by one or more processors, the one or more processors are caused to automatically generate a text description of the predicted future activity of the person of interest. When the instructions are executed by one or more processors, the one or more processors are caused to automatically provide the text description of the predicted future activity of the person of interest to a Generative AI model, wherein the Generative AI model generates a simulated video stream of the person of interest (or a generic person) performing the predicted future activity. When the instructions are executed by one or more processors, the one or more processors are caused to display the simulated video stream of the person of interest performing the predicted future activity in a prediction salvo on an operator console of a video surveillance system.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIGS. 6A, 6B, 6C, 6D and 6E are flow diagrams that together show an illustrative method for operating the video surveillance system of FIG. 1; and FIG. 7 is a flow diagram showing an illustrative series of steps that one or more processors may carry out when executing executable instructions that are stored on a nontransient, computer readable storage media.

Figure 1:
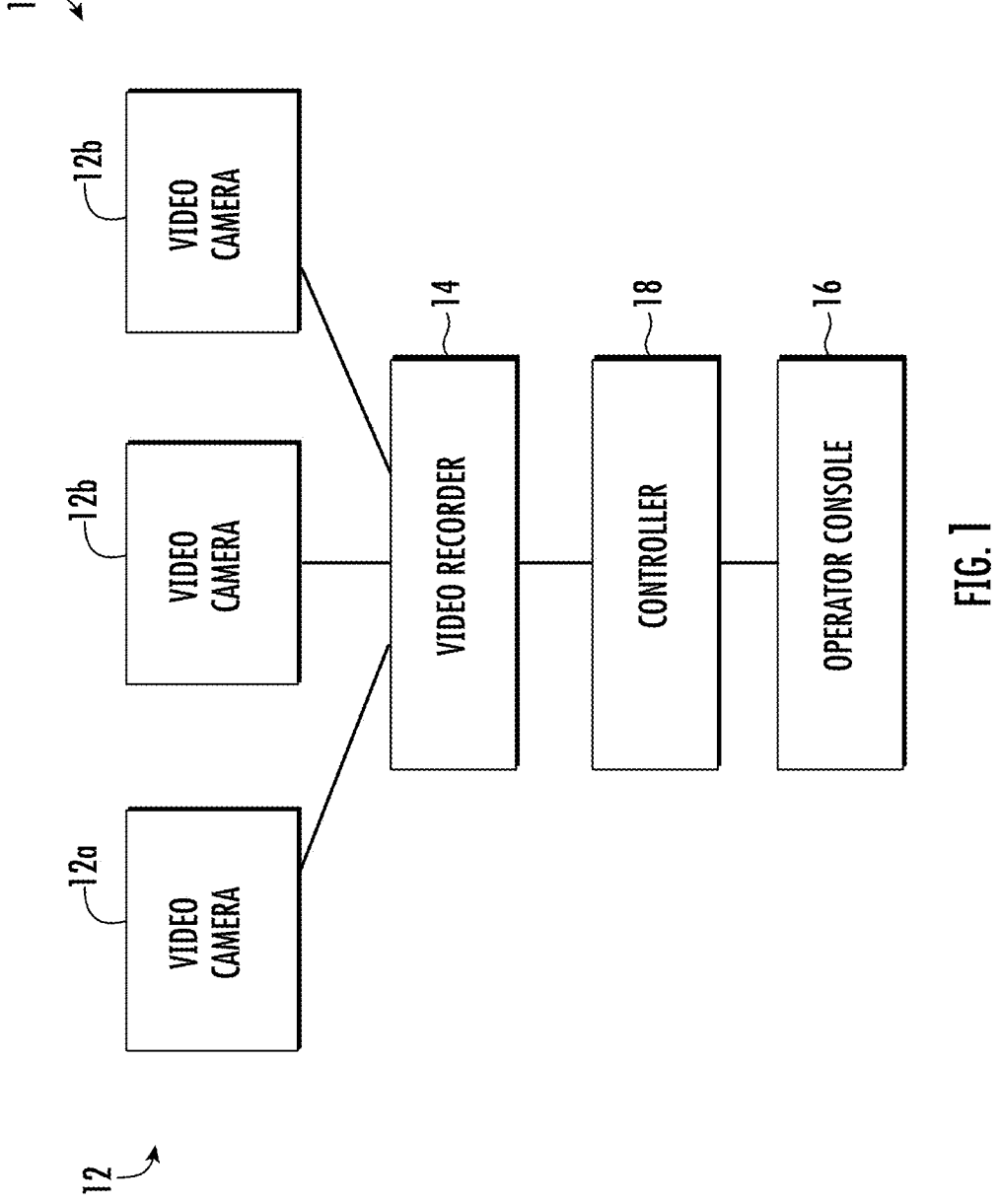
FIG. 1 is a schematic block diagram showing an illustrative video surveillance system for a facility.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/of" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative video surveillance system 10 that may be deployed within a facility or within a portion of a facility. The video surveillance system 10 includes a number of video cameras 12 that are distributed about the facility. The video cameras 12 are individually labeled as 12a, 12b and 12c. While three video cameras 12 are shown, it will be appreciated that the video surveillance system 10 may include any number of video cameras 12, and may include substantially more than three video cameras 12. The video cameras 12 may be any of a variety of different video camera types. Some of the video cameras 12 may have a fixed FOV (Field Of View). Some of the video cameras 12 may be PTZ (Pan Tilt Zoom) cameras that are configured to adjust their FOV. Each of the video cameras 12 produce a video stream. Each of the video cameras 12 provide their video stream to a video recorder 14 that is configured to record each of the video streams. The video surveillance system 10 includes an operator console 16 that allows an operator to display and view video streams (live and recorded video streams), for example.

The video surveillance system 10 also includes a controller 18 that is operatively coupled to the video cameras 12, the video recorder 14 and the operator console 16. In some cases, there may be direct physical connections between one or more of the controller 18, the video cameras 12, the video recorder 14 and the operator console 16. In some cases, one or more of the controller 18, the video cameras 12, the video recorder 14 and the operator console 16 may be operably coupled together by being connected to a network. As an example, one or more of the controller 18, the video cameras 12, the video recorder 14 and the operator console 16 may be operably coupled together by being connected to a LAN (Local Area Network) and/or a WAN (Wide Area Network). In some cases, one or more of the controller 18, the video cameras 12, the video recorder 14 and the operator console 16 may be operably coupled together by being connected to the Internet. In some cases, the controller 18 may be a distributed controller that is distributed between the facility in which the video surveillance system 10 is deployed, and a remote server.

The controller 18 may be configured to process each of the video streams using video analytics to identify people in the plurality of video streams and to identify an intent of each of the identified people based at least in part on the activities of the identified people captured by one or more of the plurality of video streams. The controller 18 may be configured to classify the identified intent of each of the identified people into one of a plurality of intent categories, wherein one of the plurality of intent categories corresponds to an intent of concern. The intent of concern may be, for example, theft, loitering, hiding, improper surveilling, improper access to a secure area, and/or any other intent of that is of concern to the facility manager.

The controller 18 may be configured to identify a person of interest as a person that has an identified intent that is classified as an intent of concern. The controller 18 may be configured to carry out several steps for the person of interest. These steps include using one or more trained Artificial Intelligence (AI) models to predict a future activity of the person of interest based at least in part on the identified intent of the person of interest. These steps include providing a description of the predicted future activity of the person of interest to a Generative AI model, wherein the Generative AI model generates a simulated video stream of the person of interest performing the predicted future activity. These steps further include displaying the simulated video stream of the person of interest performing the predicted future activity in a prediction salvo on the operator console 16.

In some cases, the controller 18 may be configured to display one or more of the plurality of video streams currently capturing the person of interest (live video) in a current view salvo on the operator console 16, wherein the current view salvo and the prediction salvo are concurrently displayed on the operator console 16. The controller 18 may be configured to process the recorded video streams to identify past activities of the person of interest in the facility, and display a summarization of the identified past activities of the person of interest in a summarization salvo on the operator console 16. In some cases, the summarization salvo may be concurrently displayed with the current view salvo and/or the prediction salvo.

Figure 2:
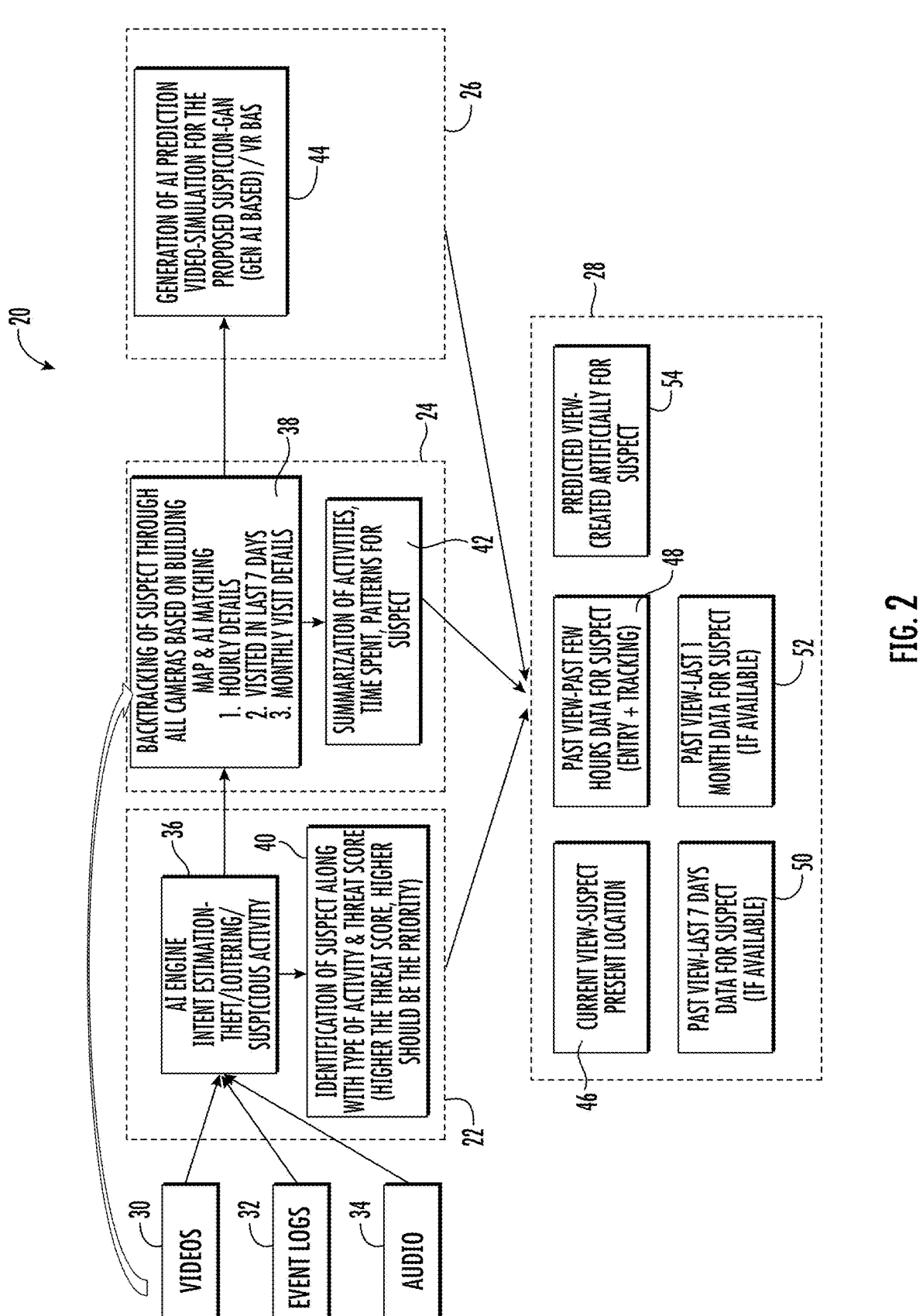
FIG. 2 is a schematic block diagram showing an illustrative system having three AI engines producing salvo views on an operator console.

FIG. 2 is a schematic block diagram showing an illustrative system 20 having three AI engines producing salvo views on the operator console 16. In some cases, at least portions of the illustrative system 20 may be manifested within the controller 18 shown in FIG. 1. As shown, the system 20 may include a first AI engine 22 that is directed to detection, a second AI engine 24 that is directed to tracking, and a third engine 26 that is directed to making predictions. In some sense, the first AI engine 22 may be considered as being concerned with a current view, the second AI engine 24 may be considered as being concerned with a past view, and the third AI engine 216 may be considered as being concerned with a predicted (future) view. Together, the first AI engine 22, the second AI engine 24 and the third AI engine 26 generate salvo views 28 that may be displayed on the operator console 16 shown in FIG. 1.

The first AI engine 22 may process each of the video streams 30 using video analytics to identify people in the plurality of video streams. Alternatively, each of the video cameras 12 (see FIG. 1) may process their video stream using video analytics to identify people in their video stream, and generate and send metadata to the first AI engine 22 that identifies the people in their video stream.

In the example shown, the first AI engine 22, the second AI engine 24 and the third AI engine 26 receive inputs from multiple sources, including a video source 30, an event log source 32 and an audio source 34. All three sources provide input to an AI Engine Intent Estimator block 36 within the first AI engine 22. In some cases, the video source 30 may provide input to a Backtracking block 38 within the second AI engine 24. The AI Engine Intent Estimator block 36 identifies an intent of each of the people identified in the video streams based at least in part on the activity of each of the people captured in the video streams, and classifies the intent into one of a plurality of intent categories, wherein one of the plurality of intent categories corresponds to an intent of concern (e.g. theft, loitering, hiding, improper surveilling, improper access to a secure area, and/or any other intent of that is of concern to the facility manager). The AI Engine Intent Estimator block 36 identifies persons of interest (e.g. suspects) as persons that have an identified intent that is classified as an intent of concern. The AI Engine Intent Estimator block 36 may identify each of the persons of interest, the type of activity engaged in by each of the persons of interest, and in some cases a threat score for each of the persons of interest.

This information may be provided to the Backtracking block 38 of the second AI engine 24. The Backtracking block 38 outputs a summary of the activities of the persons of interest, the time spent and/or other patterns of the persons of interest. This information may be provided to a Generation block 44 of the third AI engine 24. Each of the first AI engine 22, the second AI engine 24 and the third AI engine 26 may contributes to the salvo views 28.

The salvo views 28 includes a Current Salvo View 46 that shows a current location of a person of interest (e.g. suspect). A Past Salvo View 48 shows where the suspect has been in the past few hours. A Past Salvo View 50 shows where the suspect has been in the past week or so. A Past Salvo View 52 shows where the suspect has been in the past month or so. In some cases, older history, such as that shown in the Past Salvo View 50 and/or the Past Salvo View 52 may not be available. In this case, the Past Salvo View 50 and/or the Past Salvo View 52 may not be included in the salvo views 28. In some cases, the respective time frames assigned to each of the Past Salvo View 48, the Past Salvo View 50 and the Past Salvo View 52 may be different than what is shown. For example, the Past Salvo View 48 may correspond to showing where the suspect has been in the past hour, or perhaps the past 30 minutes, or perhaps the past 15 minutes. The Past Salvo View 50 may correspond to showing where the suspect has been in the past day, for example. The Past Salvo View 52 may correspond to showing where the suspect has been in the past two weeks, for example.

Figure 3:
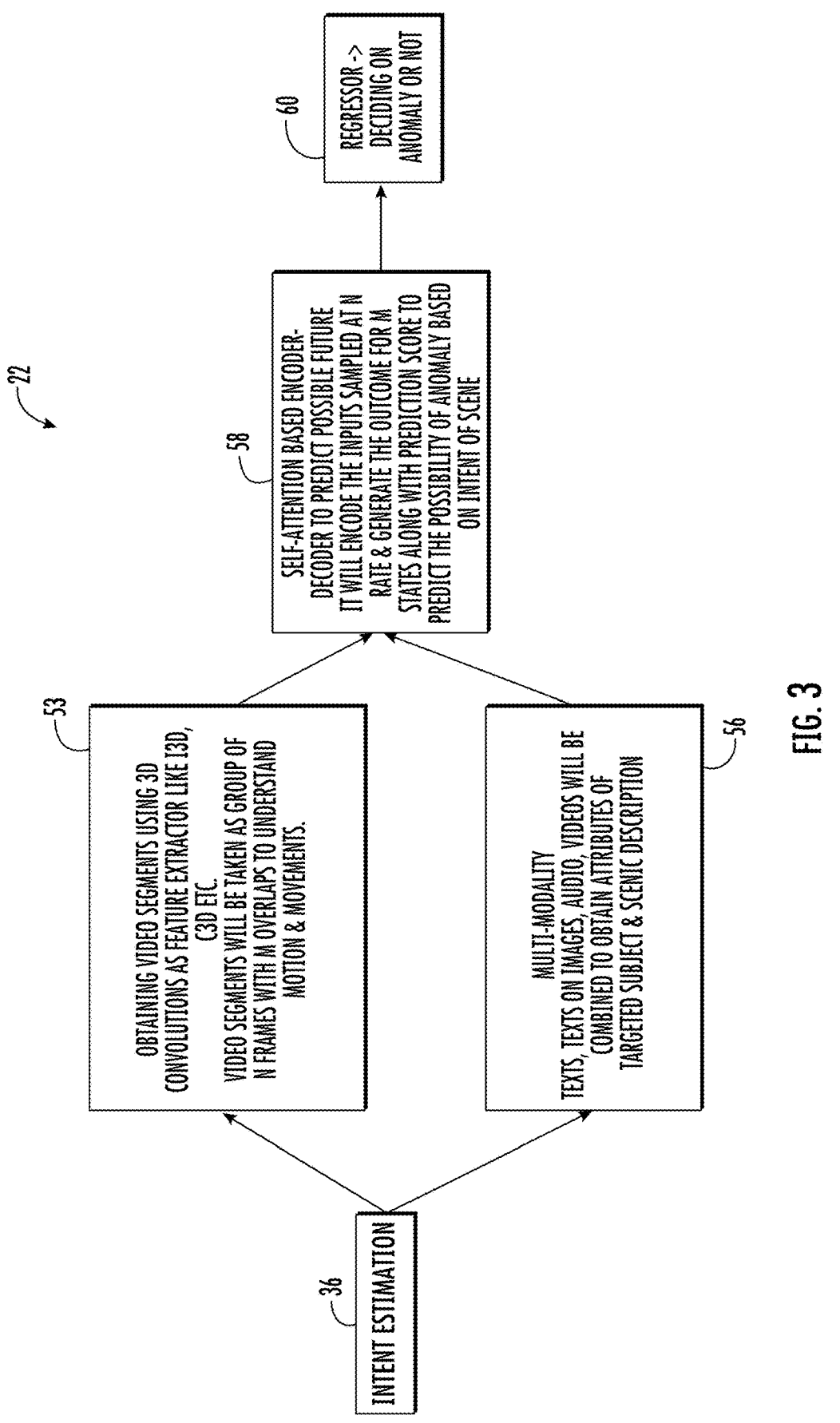
FIG. 3 is a schematic block diagram showing an illustrative first AI engine of the system of FIG. 2.

FIG. 3 is a schematic block diagram providing more details regarding the first AI engine 22 of FIG. 2. The Intent Estimator block 36 provides video segments 53 and multimodal text information 56 to an Encoder-Decoder block 58. In some cases, the video segments 53 may include groups of "n" frames having "m" overlaps. In some cases, the multimodal text information 56 may be more accurate if taken from multiple sources. The Encoder-Decoder block 58 encodes the inputs and generates one or more possible future activities of a person, along with a predicted likelihood for each of the future possible activities based at least in part on the identified intent of the corresponding person. This information is provided to a Regressor block 60, which determines whether the person is to be classified as a person of interest.

Figure 4:
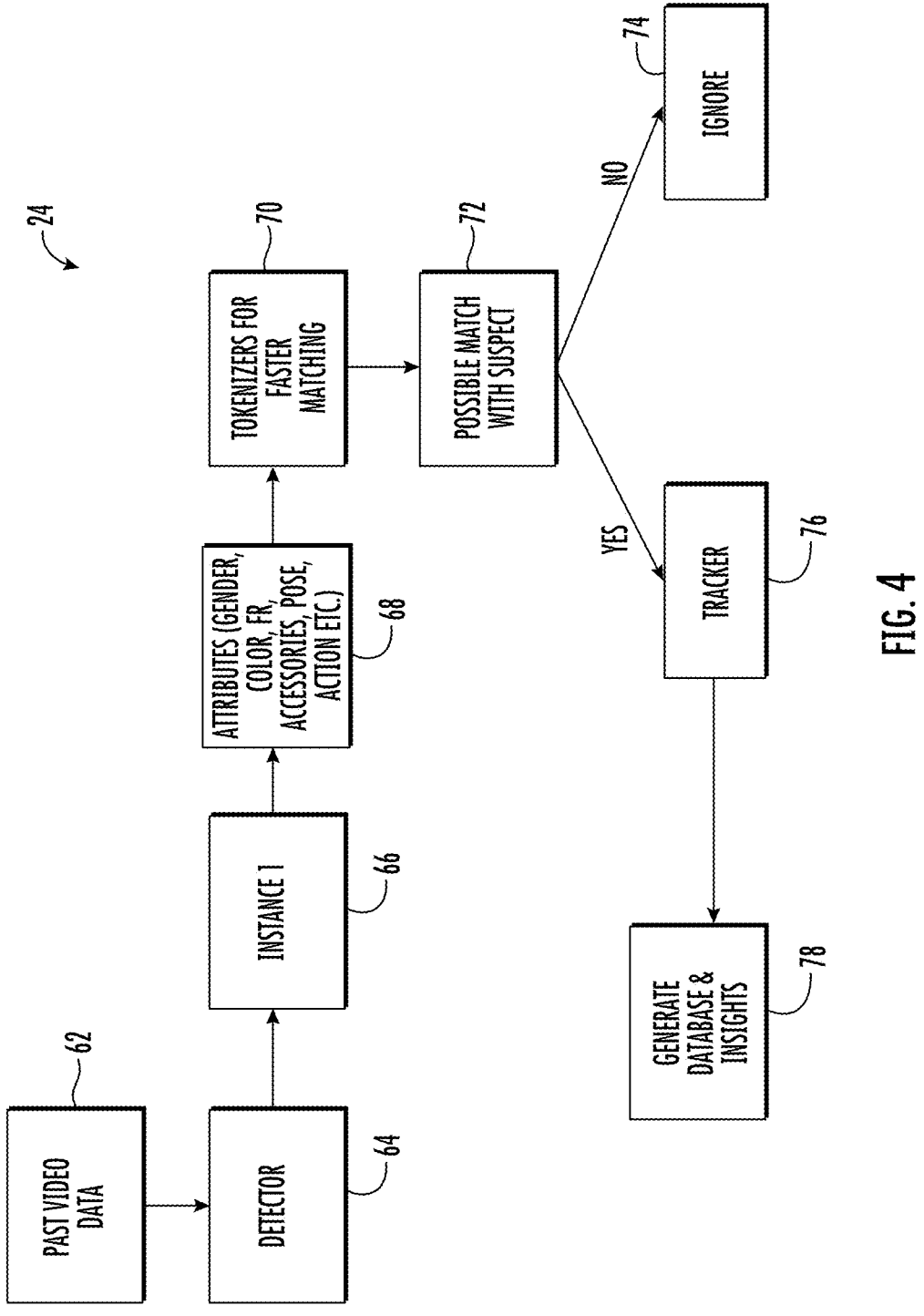
FIG. 4 is a schematic block diagram showing an illustrative second AI engine of the system of FIG. 2.

FIG. 4 is a schematic block diagram providing more details regarding the second AI engine 24 and how the second AI engine 24 backtracks to accumulate information. A past video source 62 (e.g. video recorder 14) provides video data to a detector block 64. In some cases, the detector block 64 may be Deep Learning based. The detector block 64 may output a first Instance 66 of the person of interest identified by the first AI engine 22. In some cases, a person re-identification model may be used, in combination with the first Instance 66, to find additional attributes 68 of the person of interest. Scores calculated from the additional attributes 68 may be provided to a Tokenizer block 70, where tokenizers may be used for faster matching of people in past videos with the person of interest identified by the first AI engine 22. At a decision block 72, a determination is made as to whether there is a possible match with the person of interest (e.g. suspect). If not, control goes to block 74 and the first Instance 66 is ignored. If so, control passes to a Tracker block 76, where the person is tracked. A database and insights may be generated at block 78.

A summary of the activities of the person of interest may be assembled and displayed in a summarization salvo on the operator console. The summary may be a text-based description of the past activities of the person of interest. The text description may include the location and time of the past activities (e.g. the person of interest has approached and loitered near the south door the past three days but did not enter). The summary may include one or more video clips showing the past activities of interest. The video clips may include timestamps and perhaps a location identifier. These are only examples.

Figure 5:
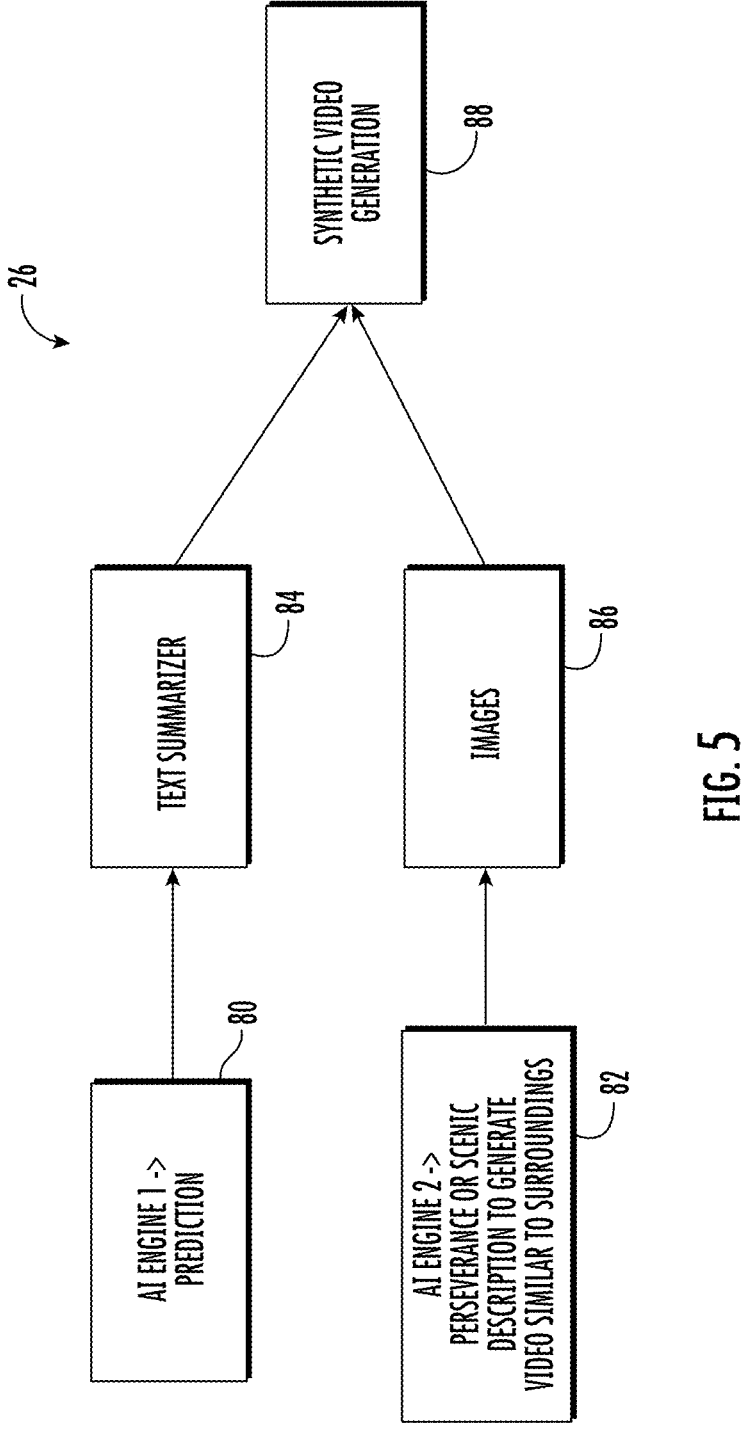
FIG. 5 is a schematic block diagram showing an illustrative third AI engine of the system of FIG. 2.

FIG. 5 is a schematic block diagram showing more details regarding the third AI engine 26. Block 80 may provide a prediction of future possible activities of one or more of the people of interest. Block 80 may include the first AI engine 22. As detailed above, the Encoder-Decoder block 58 (see FIG. 3) of the first AI engine 22 may encode the inputs and generate one or more possible future activities of a person, along with a predicted likelihood for each of the future possible activities based at least in part on the identified intent of the corresponding person. The second AI engine 24 may capture additional details as indicated at block 82, and these additional details may include, for example, one or more images of the person of interest and/or one or more images of the locations (hallways, rooms, corridors) that the future possible activities are predicted to occur, extracted from one or more of the plurality of video streams. In the example shown, the prediction from block 80 is provided to a text summarizer block 84, which summarizes the each activity if interest in a textual prose suitable for feeding to a Synthetic Video Generation block 88. The additional details from block 82 may be provided to an Images block 86. Information from the text summarizer block 84 and from the Images block 86 are provided as input to the Synthetic Video Generation (Gen AI) block 88, which generates images and/or video clips of what might be viewed if the suspect actually does what is predicted.

FIGS. 6A, 6B, 6C, 6D and 6E are flow diagrams that together show an illustrative method 90 for operating a video surveillance system (such as the video surveillance system 10) of a facility, the video surveillance system including a plurality of video cameras (such as the video cameras 12) that are distributed about the facility. The method 90 includes receiving a plurality of video streams each from a corresponding one of the plurality of video cameras, as indicated at block 92. The plurality of video streams are recorded on a video recorder, as indicated at block 94. Each of the video streams are processed using video analytics to identify people in the plurality of video streams, as indicated at block 96. One or more trained Artificial Intelligence (AI) models are used to identify an intent of each of the identified people based at least in part on one or more of the plurality of video streams, as indicated at block 98. The identified intent of each of the identified people is classified into one of a plurality of intent categories, wherein one of the plurality of intent categories corresponds to an intent of concern, as indicated at block 100.

Continuing on FIG. 6B, a person is identified as a person of interest when that person has an identified intent that is classified as an intent of concern, as indicated at block 102. For a person of interest, the recorded video streams are processed to identify past activities of the person of interest in the facility, and a summarization of the identified past activities of the person of interest is displayed in a summarization salvo (e.g. past view salvo) on an operator console, as indicated at block 102a. For the person of interest, one or more trained Artificial Intelligence (AI) models are used to predict a future activity of the person of interest based at least in part on the identified intent of the person of interest, as indicated at block 102b. For the person of interest, a description of the predicted future activity of the person of interest is provided and one or more images of the person of interest and/or one or more images of the locations (hallways, rooms, corridors) that the future possible activities are predicted to occur, extracted from one or more of the plurality of video streams are provided to a Generative AI model, wherein the Generative AI model generates a simulated image and/or a simulated video stream of the person of interest performing the predicted future activity, as indicated at block 102c. As an example, the Generative AI model that generates the simulated video stream of the person of interest performing the predicted future activity may include a Generative Adversarial Network (GAN) model. The simulated video stream of the person of interest performing the predicted future activity is displayed in a prediction salvo 54 on the operator console, as indicated at block 102d.

In some cases, the method 90 may include identifying a current video stream of the plurality of video streams that is currently capturing the particular person of interest, as indicated at block 104. The current video stream that is currently capturing the person of interest may be displayed in a tracking salvo 46 on the operator console concurrently with the prediction salvo 54, as indicated at block 106.

Continuing on FIG. 6C, the method 90 may include identifying a recorded video stream of the plurality of video streams that captures one or more of the past activities of the person of interest, as indicated at block 108. The recorded video stream that captures one or more of the past activities of the person of interest may be displayed in a past activity salvo 48 on the operator console concurrently with the tracking salvo 46 and the prediction salvo 54, as indicated at block 110.

In some cases, the method 90 may include identifying a recorded video stream of the plurality of video streams that captures one or more of the past activities of the person of interest, as indicated at block 112. The recorded video stream that captures one or more of the past activities of the person of interest may be displayed in a past activity salvo 50 on the operator console, as indicated at block 114.

In some cases, the method 90 may include identifying a video camera of the plurality of video cameras that is expected to capture the predicted future activity of the person of interest, as indicated at block 116. The current video stream from the video camera that is expected to capture the predicted future activity of the person of interest may be automatically displayed in a separate salvo on the operator console, as indicated at block 118.

In some cases, the method 90 may include using one or more trained Artificial Intelligence (AI) models to predict a plurality of possible future activities of the person of interest based at least in part on the identified intent of the person of interest, as indicated at block 120. A plurality of video cameras are identified that each are expected to capture one of the plurality of possible future activities of the person of interest, as indicated at block 122. Continuing on FIG. 6D, the current video stream from each of the plurality of video cameras that are expected to capture one of the plurality of possible future activities of the person of interest may be automatically displayed in a respective salvo on the operator console, as indicated at block 124.

In some cases, the method 90 may include determining a confidence score in the prediction of the future activity of the person of interest, as indicated at block 126. The confidence score may be displayed concurrently with the simulated video stream on the operator console, as indicated at block 128. In some cases, the method 90 may include using one or more trained Artificial Intelligence (AI) models to predict the future activity of the person of interest based at least in part on the identified intent of the person of interest and one or more of the identified past activities of the person of interest, as indicated at block 130.

In some cases, the method 90 may include identifying one or more of the identified past activities of the person of interest that provide context for the classification of the intent of the person of interest as an intent of concern, as indicated at block 132. A recorded video stream that captures the one or more of the past activities of the person of interest identified as providing context for the classification of the intent of the person of interest as an intent of concern may be displayed in a context salvo on the operator console, as indicated at block 134.

In some cases, the method 90 may include processing the video streams using video analytics to identify a track of one or more of the people identified in the plurality of video streams, as indicated at block 136. Continuing on FIG. 6E, one or more trained Artificial Intelligence (AI) models may be used to identify the intent of each of the identified people based at least in part on the identified track of the corresponding person, as indicated at block 138.

In some cases, the method 90 may include processing the video streams using video analytics to identify one or more behaviors of one or more of the people identified in the plurality of video streams, as indicated at block 140. One or more trained Artificial Intelligence (AI) models may be used to identify the intent of each of the identified people based at least in part on one or more of the identified behaviors of the corresponding person, as indicated at block 142.

In some cases, the method 90 may include receiving one or more event logs that include logged events (e.g. card swipes) from a Building Management System (BMS) of the facility, as indicated at block 144. One or more trained Artificial Intelligence (AI) models may be used to identify the intent of each of the identified people based at least in part on one or more of the plurality of video streams and on one or more of the logged events, as indicated at block 146.

In some cases, the method 90 may include receiving one or more audio streams captured by one or more microphones of a Building Management System (BMS) of the facility, as indicated at block 148. One or more trained Artificial Intelligence (AI) models may be used to identify the intent of each of the identified people based at least in part on one or more of the plurality of video streams and on one or more of the audio streams, as indicated at block 150.

FIG. 7 is a flow diagram that shows a series of steps 152 that may be carried out by one or more processors when the one or more processors execute instructions that are stored on a non-transitory computer readable medium. The one or more processors may be part of the controller 18 shown in FIG. 1, for example. The one or more processors may be caused to use one or more trained Artificial Intelligence (AI) models to predict a future activity of a person of interest, as indicated at block 154. The one or more processors may be caused to automatically generate a text description of the predicted future activity of the person of interest, as indicated at block 156. The one or more processors may be caused to automatically provide the text description of the predicted future activity of the person of interest to a Generative AI model, wherein the Generative AI model generates a simulated video stream of the person of interest performing the predicted future activity, as indicated at block 158. The one or more processors may be caused to display the simulated video stream of the person of interest performing the predicted future activity in a prediction salvo on an operator console of a video surveillance system, as indicated at block 160. In some cases, the one or more processors may be caused to provide one or more images of the person of interest to the Generative AI model, wherein the Generative AI model generates the simulated video stream of the person of interest performing the predicted future activity based at least in part on the text description of the predicted future activity of the person of interest and the one or more images of the person of interest, as indicated at block 162.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for operating a video surveillance system of a facility, the video surveillance system including a plurality of video cameras distributed about the facility, the method comprising:

receiving a plurality of video streams each from a corresponding one of the plurality of video cameras;

recording the plurality of video streams on a video recorder;

processing each of the video streams using video analytics to identify people in the plurality of video streams;

using one or more trained Artificial Intelligence (AI) models to identify an intent of each of the identified people based at least in part on one or more of the plurality of video streams;

classifying the identified intent of each of the identified people into one of a plurality of intent categories, wherein one of the plurality of intent categories corresponds to an intent of concern;

identifying a person of interest as a person that has an identified intent that is classified as an intent of concern, and for the person of interest:

processing the recorded video streams to identify past activities of the person of interest in the facility, and displaying a summarization of the identified past activities of the person of interest in a summarization salvo on an operator console;

using one or more trained Artificial Intelligence (AI) models to predict a future activity of the person of interest based at least in part on the identified intent of the person of interest;

providing a description of the predicted future activity of the person of interest and providing one or more images of the person of interest extracted from one or more of the plurality of video streams to a Generative AI model, wherein the Generative AI model generates a simulated video stream of the person of interest performing the predicted future activity; and displaying the simulated video stream of the person of interest performing the predicted future activity in a prediction salvo on the operator console.

2. The method of claim 1, comprising:

identifying a current video stream of the plurality of video streams that is currently capturing the person of interest; and displaying the current video stream that is currently capturing the person of interest in a tracking salvo on the operator console concurrently with the prediction salvo.

3. The method of claim 2, comprising:

identifying a recorded video stream of the plurality of video streams that captures one or more of the past activities of the person of interest; and displaying the recorded video stream that captures one or more of the past activities of the person of interest in a past activity salvo on the operator console concurrently with the tracking salvo and the prediction salvo.

4. The method of claim 1, comprising:

identifying a recorded video stream of the plurality of video streams that captures one or more of the past activities of the person of interest; and displaying the recorded video stream that captures one or more of the past activities of the person of interest in a past activity salvo on the operator console.

5. The method of claim 1, comprising:

identifying a video camera of the plurality of video cameras that is expected to capture the predicted future activity of the person of interest; and automatically displaying the current video stream from the video camera that is expected to capture the predicted future activity of the person of interest in a separate salvo on the operator console.

6. The method of claim 1, comprising:

using one or more trained Artificial Intelligence (AI) models to predict a plurality of possible future activities of the person of interest based at least in part on the identified intent of the person of interest;

identifying a plurality of video cameras that are each are expected to capture one of the plurality of possible future activities of the person of interest; and automatically displaying the current video stream from each of the plurality of video cameras that are expected to capture one of the plurality of possible future activities of the person of interest in a respective salvo on the operator console.

7. The method of claim 1, comprising:

determining a confidence score in the prediction of the future activity of the person of interest; and display the confidence score concurrently with the simulated video stream on the operator console.

8. The method of claim 1, comprising:

using one or more trained Artificial Intelligence (AI) models to predict the future activity of the person of interest based at least in part on the identified intent of the person of interest and one or more of the identified past activities of the person of interest.

9. The method of claim 1, wherein the Generative AI model that generates the simulated video stream of the person of interest performing the predicted future activity comprises a Generative Adversarial Network (GAN) model.

10. The method of claim 1, comprising:

identifying one or more of the identified past activities of the person of interest that provide context for the classification of the intent of the person of interest as an intent of concern; and displaying a recorded video stream that captures the one or more of the past activities of the person of interest identified as providing context for the classification of the intent of the person of interest as an intent of concern in a context salvo on the operator console.

11. The method of claim 1, comprising:

processing the video streams using video analytics to identify a track of one or more of the people identified in the plurality of video streams; and using one or more trained Artificial Intelligence (AI) models to identify the intent of each of the identified people based at least in part on the identified track of the corresponding person.

12. The method of claim 1, comprising:

processing the video streams using video analytics to identify one or more behaviors of one or more of the people identified in the plurality of video streams; and using one or more trained Artificial Intelligence (AI) models to identify the intent of each of the identified people based at least in part on one or more of the identified behaviors of the corresponding person.

13. The method of claim 1, comprising:

receiving one or more event logs that include logged events from a Building Management System (BMS) of the facility; and using one or more trained Artificial Intelligence (AI) models to identify the intent of each of the identified people based at least in part on one or more of the plurality of video streams and on one or more of the logged events.

14. The method of claim 1, comprising:

receiving one or more audio streams captured by one or more microphones of a Building Management System (BMS) of the facility; and using one or more trained Artificial Intelligence (AI) models to identify the intent of each of the identified people based at least in part on one or more of the plurality of video streams and on one or more of the audio streams.

15. A video surveillance system of a facility, comprising:

a plurality of video cameras distributed about the facility providing a plurality of video streams;

a video recorder recording the plurality of video streams;

an operator console;

a controller operatively coupled to the plurality of video cameras, the video recorder and the operator console, the controller configured to:

process each of the video streams using video analytics to identify people in the plurality of video streams;

identify an intent of each of the identified people based at least in part on one or more of the plurality of video streams;

classify the identified intent of each of the identified people into one of a plurality of intent categories, wherein one of the plurality of intent categories corresponds to an intent of concern;

identify a person of interest as a person that has an identified intent that is classified as an intent of concern, and for the person of interest:

use one or more trained Artificial Intelligence (AI) models to predict a future activity of the person of interest based at least in part on the identified intent of the person of interest;

provide a description of the predicted future activity of the person of interest to a Generative AI model, wherein the Generative AI model generates a simulated video stream of the person of interest performing the predicted future activity; and display the simulated video stream of the person of interest performing the predicted future activity in a prediction salvo on the operator console.

16. The video surveillance system of claim 15, wherein the controller is configured to display one or more of the plurality of video streams currently capturing the person of interest in a current view salvo on the operator console, wherein the current view salvo and the prediction salvo are concurrently displayed on the operator console.

17. The video surveillance system of claim 15, wherein the controller is configured to process the recorded video streams to identify past activities of the person of interest in the facility, and display a summarization of the identified past activities of the person of interest in a summarization salvo on the operator console.

18. The video surveillance system of claim 15, wherein the controller is a distributed controller that is distributed between the facility and a remote server.

19. A non-transitory computer readable medium storing instructions thereon that when executed by one or more processors causes the one or more processors to:

process each of a plurality of video streams using video analytics to identify people in the plurality of video streams;

use one or more trained Artificial Intelligence (AI) models to identify an intent of each of the identified people based at least in part on one or more of the plurality of video streams;

classify the identified intent of each of the identified people into one of a plurality of intent categories, wherein one of the plurality of intent categories corresponds to an intent of concern;

identifying a person of interest as a person that has an identified intent that is classified as an intent of concern, and for the person of interest:

use one or more trained Artificial Intelligence (AI) models to predict a future activity of a person of interest;

automatically generate a text description of the predicted future activity of the person of interest;

automatically provide the text description of the predicted future activity of the person of interest and one or more images of the person of interest extracted from one or more of the video streams to a Generative AI model, wherein the Generative AI model generates a simulated video stream of the person of interest performing the predicted future activity; and display the simulated video stream of the person of interest performing the predicted future activity in a prediction salvo on an operator console of a video surveillance system.

20. The non-transitory computer readable medium of claim 19, comprising: providing one or more images of the person of interest to the Generative AI model, wherein the Generative AI model generates the simulated video stream of the person of interest performing the predicted future activity based at least in part on the text description of the predicted future activity of the person of interest and the one or more images of the person of interest.

\* \* \* \* \*